United States Patent
Lewis

(10) Patent No.: US 7,818,774 B2
(45) Date of Patent: Oct. 19, 2010

(54) INTERNET PROTOCOL CONVERSION MODULE FOR TELEVISIONS

(75) Inventor: Richard Lewis, Buffalo Grove, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 1244 days.

(21) Appl. No.: 11/388,639

(22) Filed: Mar. 24, 2006

(65) Prior Publication Data

US 2007/0226772 A1  Sep. 27, 2007

(51) Int. Cl.
H04N 7/173 (2006.01)

(52) U.S. Cl. ..................................... 725/120

(58) Field of Classification Search ............. 725/81, 725/120, 132, 140, 152, 84–85; 348/839
See application file for complete search history.

(56) References Cited

U.S. PATENT DOCUMENTS

| | | | |
|---|---|---|---|
| 5,666,487 A * | 9/1997 | Goodman et al. ........... | 709/246 |
| 6,181,713 B1 * | 1/2001 | Patki et al. ................... | 370/474 |
| 2002/0083474 A1 * | 6/2002 | Hennenhoefer et al. ...... | 725/143 |
| 2004/0031058 A1 * | 2/2004 | Reisman ..................... | 725/112 |
| 2004/0181800 A1 * | 9/2004 | Rakib et al. .................. | 725/25 |
| 2005/0210515 A1 * | 9/2005 | Roh et al. ..................... | 725/81 |
| 2006/0280437 A1 * | 12/2006 | Logan et al. .................. | 386/94 |
| 2007/0089144 A1 * | 4/2007 | Du Breuil et al. ............. | 725/81 |

\* cited by examiner

*Primary Examiner*—Andrew Y. Koenig
*Assistant Examiner*—Alfonso Castro

(57) ABSTRACT

An interface module for use between a signal source and a receiver has an input, a processor, and an output. The input receives a signal from the signal source. The received signal contains MPEG files formatted according to an Internet Protocol. The processor strips the Internet Protocol formatting from the received signal and reformats the received signal as a receiver signal containing an MPEG transport stream. The output makes the reformatted signal available for supply to a port supported on a chassis of the receiver.

16 Claims, 2 Drawing Sheets

INTERNET PROTOCOL CONVERSION MODULE FOR TELEVISIONS

TECHNICAL FIELD OF THE INVENTION

The present invention relates to a conversion module that can be coupled to a port on a chassis of a receiver, such as a television, and that converts a signal from an Internet Protocol format to a format useable by the receiver.

BACKGROUND OF THE INVENTION

Receivers, such as digital televisions complying with the ATSC digital television standard, receive signals from a variety of sources. For example, receivers receive signals from terrestrially based antennae, from satellite dishes, from cables, etc.

Receivers such as televisions are also used in environments in which they receive signals over other types of networks. For example, networks are frequently used in buildings such as hotels and motels to distribute at least some signals from a source, such as a server, to receivers that are distributed through the building (or buildings).

An example of such a network 10 is shown in FIG. 1. The network 10 includes a television 12, such as a digital television complying with the ATSC digital television standard, that is coupled to an RF distribution network 14 by a standard interface module 16. The standard interface module 16 may be used to initially set-up or configure the receiver 12. A video server 18 is also coupled to the RF distribution network 14 so that RF signals from the video server 18 can be communicated in a standard format capable of being directly received and processed by the receiver 12.

The receiver 12 has a chassis 20 supporting a port 22 that may be used to couple the standard interface module 16 to the television 12 and/or to other devices. The port 22, for example, includes an RF connection 24, a power connection 26, and a control connection 28. The RF connection 24 is used to couple RF signals from the standard interface module 16 to the television 12, the power connection 26 is used to provide power to the standard interface module 16, and the control connection 28 is used to exchange control information between the television 12 and the standard interface module 16. The RF connection 24, the power connection 26, and the control connection 28 of the port 22 may be part of an interface module 30 of the television 12.

The control pass through line of the standard interface module 16 may be used for cloning as well as volume and channel control as is known in the art.

The receiver 12 further includes a tuner/demodulator 32, a decrypter 34, and an MPEG decoder 36 that receive the RF signal over the RF connection 24 and that suitably processes the RF signal to provide a video output 38 for display on a screen such as a CRT or LCD. Accordingly, the tuner/demodulator 32 tunes to a selected RF channel and demodulates the RF signal on the selected RF channel, the decrypter 34 decrypts the demodulated signal, and the MPEG decoder 36 decodes the MPEG packets contained in the decrypted signal and otherwise processes the decoded information for display on the video output 38. Although not shown, audio is alternatively or additionally likewise processed and provided to speakers of the receiver 12.

The video server 18 includes a storage medium 40 that stores MPEG files for supply to the television 12. These MPEG files can be encrypted files. When the MPEG files are supplied to the television 12, these files are suitably modulated by a modulator 42, they are up converted to a selected channel by an up converter 44, and they are supplied as RF signals through the RF distribution network 14 to the rooms or areas of the building such as the room or area containing the television 12. If the receiver 12 is a digital television that complies with the ATSC digital television standard, the modulator 42 may be a VSB modulator.

In this room or area, these RF signals are coupled to the television 12 through the standard interface module 16. As shown in FIG. 1, the RF signals are passed through the standard interface module 16 to the RF connection 24 of the television 12. Power is provided to the standard interface module 16 from the television 12, and any control signals supplied from the video server 18 to the television 12 or from the television 12 to the video server 18 are passed through the standard interface module 16.

Video servers for applications such as that shown in FIG. 1 have been developed to distribute MPEG files using the Internet Protocol. Accordingly, the MPEG files are formatted for distribution using the Internet Protocol.

The Internet Protocol (IP) is the method or protocol by which messages are formatted so that they can be sent from one computer to another on the Internet. Each computer (known as a host) on the Internet has at least one IP address that uniquely identifies it from all other computers on the Internet. When a message is received or sent, the message gets divided into packets. Each packet contains both the sender's Internet address and the receiver's Internet address. A packet is sent first to a gateway computer that reads the destination address and forwards the packet to an adjacent gateway that in turn reads the destination address and so forth across the Internet until one gateway recognizes the packet as belonging to a computer within its immediate neighborhood or domain. That gateway then forwards the packet directly to the computer whose address is specified. Because a message is divided into a number of packets, each packet can be sent by a different route across the Internet. It is possible for packets to arrive in a different order from that in which they were sent. The Transmission Control Protocol (TCP) puts the packets back in the right order.

When the Internet Protocol is used to format signals for distribution, a module in the receiver can be used to suitably reformat the signals so that the signals can be properly processed by the receivers. However, incorporating such a module in receivers requires either that all receivers include the module or that just those receivers to be used in Internet Protocol based networks include the module.

If all receivers are equipped with an Internet Protocol reformatting module, inventory management is less complicated. However, the cost of every receiver is increased by the cost of the additional module. On the other hand, if only those receivers to be used in connection with Internet Protocol based networks are equipped with the Internet Protocol reformatting module, no additional cost is added to those receivers that are not targeted for this application. However, inventory management requires control of two types of receiver making inventory management more complicated.

What is needed is a module that provides Internet Protocol conversion. However, as can be seen from FIG. 1, the standard interface module does not have the capability of reformatting signals distributed using the Internet Protocol so that the content of such signals can be properly received by a receiver. The present invention is directed to a module that provides Internet Protocol conversion.

SUMMARY OF THE INVENTION

In accordance with one aspect of the present invention, an interface module for use between a signal source and a receiver comprises an input, a processor, and an output. The input receives a signal from the signal source, and the received signal contains MPEG files formatted according to an Internet Protocol. The processor strips the Internet Protocol formatting from the received signal and reformats the received signal as a receiver signal containing an MPEG transport stream. The output makes the reformatted signal available for supply to a port supported on a chassis of the receiver.

In accordance with another aspect of the present invention, a backwards compatible interface module for use in providing an interface between a signal source and a digital television comprises an input, a re-formatter, a VSB modulator, and an output. The input receives a signal containing MPEG files formatted according to an Internet Protocol. The re-formatter strips the Internet Protocol formatting from the received signal and reformats the received signal as an MPEG transport stream. The VSB modulator modulates the MPEG transport stream onto an RF channel. The output makes the modulated MPEG transport stream available for supply to a port supported on a chassis of the digital television.

In accordance with still another aspect of the present invention, an Internet Protocol interface module is provided for use as an interface between a signal source and a digital television. The signal source provides an Internet Protocol formatted signal. The Internet Protocol interface module comprises first and second inputs, an output, an input side terminal, an output side terminal, first and second connections, a re-formatter, and a VSB modulator. The first input receives an RF signal. The second input receives the Internet Protocol formatted signal containing MPEG files. The first connection passes the received RF signal directly to the output. The second connection passes control information directly from the output side terminal to the input side terminal. The re-formatter strips the Internet Protocol formatting from the received signal, reformats the received signal as an MPEG transport stream, and passes control information to the output side terminal. The VSB modulator modulates the MPEG transport stream onto an RF channel and passes the modulated MPEG transport stream to the first connection for supply to the output.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
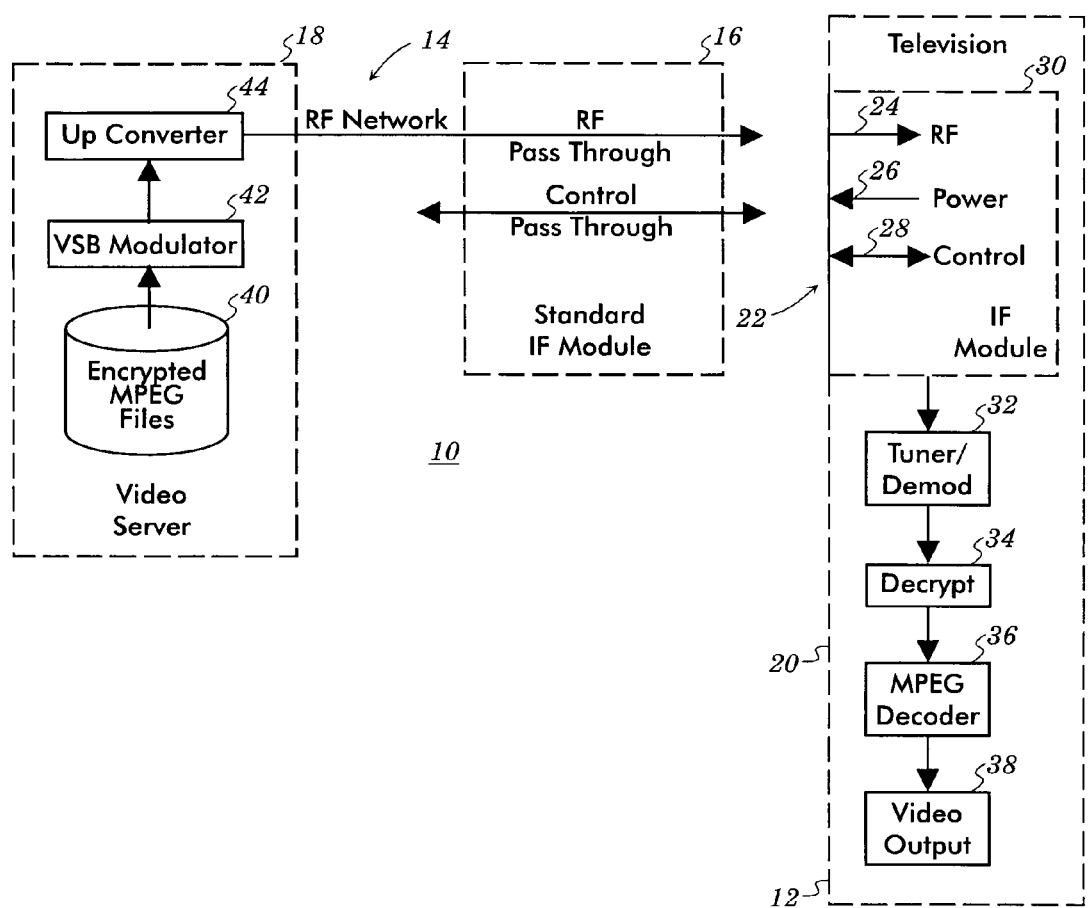
FIG. 1 illustrates a prior art RF network for distributing RF signals.
Figure 2:
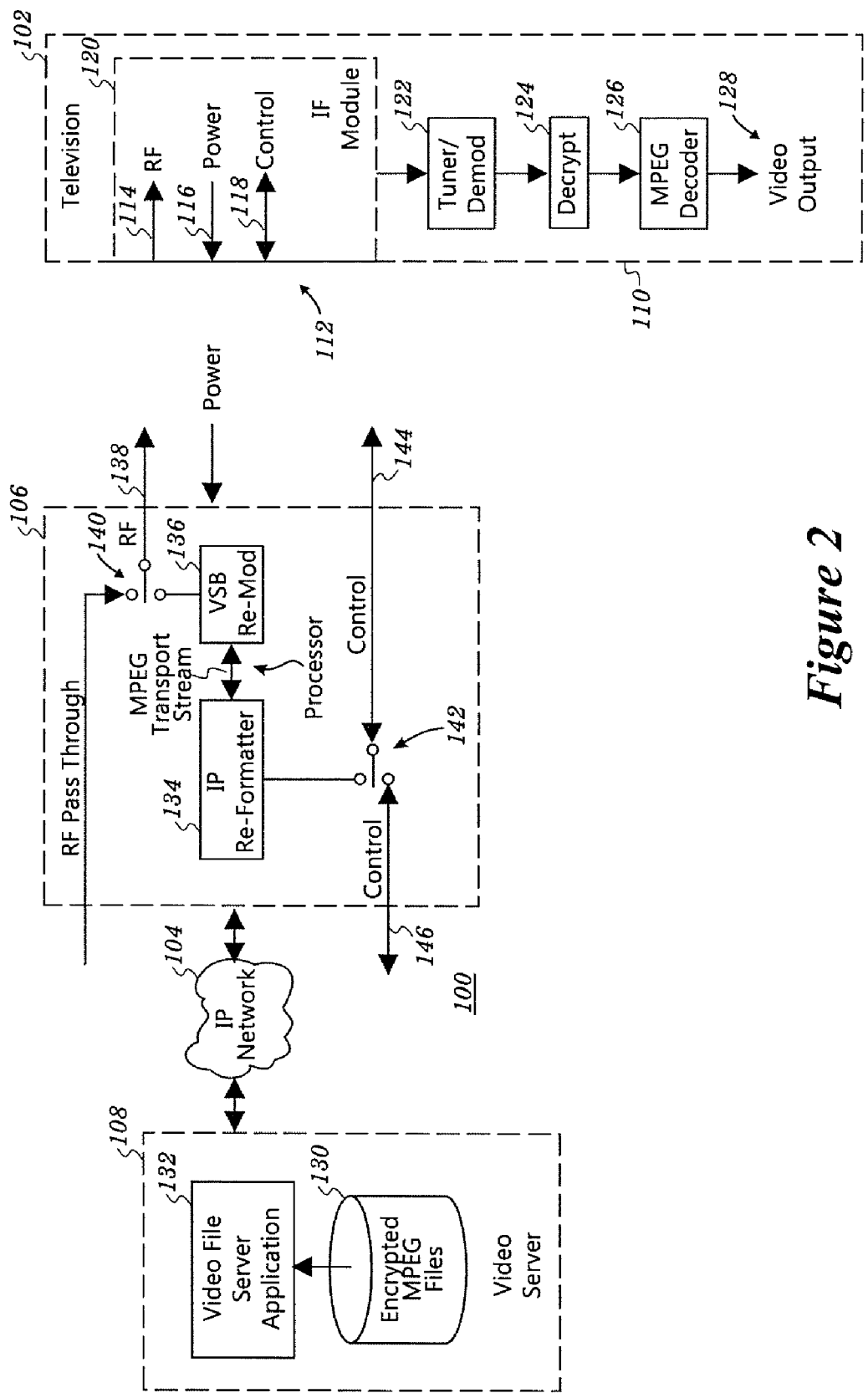
FIG. 2 illustrates a network including an Internet Protocol conversion module in accordance with an embodiment of the present invention.

As shown in FIG. 2, an Internet Protocol based network 100 includes a receiver 102, which may comprise a television such as digital television complying with the ATSC digital television standard, that is coupled to an Internet Protocol distribution network 104 by an Internet Protocol conversion module 106. A signal source 108 is also coupled to the Internet Protocol distribution network 104 so that the Internet Protocol conversion module 106 receives signals from the signal source 108 for communication to the receiver 102. The signal source 108 distributes its signals in the Internet Protocol format. The signal source 108, for example, may be a video server. The Internet Protocol conversion module 106 may be a processor such as a state machine, or a central processing unit, or any other suitable processor, etc.

The receiver 102 has a chassis 110 supporting a port 112 that may be used to couple the Internet Protocol conversion module 106 to the receiver 102. The port 112, for example, includes an RF connection 114, a power connection 116, and a control connection 118. The RF connection 114 is used to couple RF signals from the Internet Protocol conversion module 106 to the receiver 102, the power connection 116 is used to provide power to the Internet Protocol conversion module 106, and the control connection 118 is used to exchange control information between the receiver 102 and the Internet Protocol conversion module 106. The RF connection 114, the power connection 116, and the control connection 118 of the port 112 may be part of an interface module 120 of the receiver 102.

The receiver 102 may further include a tuner/demodulator 122, a decrypter 124, and an MPEG decoder 126 that receive the RF signal over the RF connection 114. In the case where the receiver 102 is a television, the output of the MPEG decoder 126 is provided as a video output 128 for display on a screen such as a CRT or LCD. Accordingly, the tuner/demodulator 122 tunes to a selected RF channel and demodulates the RF signal on the selected RF channel, the decrypter 124 decrypts the demodulated signal, and the MPEG decoder 126 decodes the MPEG packets contained in the decrypted signal and otherwise processes the decoded information for display on the video output 128. Although not shown, audio is alternatively or additionally likewise processed and provided to speakers of the receiver 102.

The signal source 108 includes a storage medium 130. In the case where the signal source 108 supplies digital television signals through the Internet Protocol distribution network 104, the signal source 108 may be a video server and the storage medium 130 may store MPEG files for supply to the receiver 102. Before distribution through the Internet Protocol distribution network 104, the MPEG files stored by the storage medium 130 are converted to the Internet Protocol and are otherwise processed by an application 132 which, for example, may be a video file server application. For example, the application 132 may be arranged to packetize the MPEG files and to add flow control and routing information to the packets in accordance with the Internet Protocol. Following formatting according to the Internet Protocol, the application 132 supplies the Internet Protocol formatted and MPEG files as RF signals over the Internet Protocol distribution network 104.

The Internet Protocol conversion module 106 receives the Internet Protocol formatted and MPEG files as RF signals from the Internet Protocol distribution network 104 and reformats the Internet Protocol formatted and MPEG files as RF signals for supply to the receiver 102. Accordingly, the Internet Protocol conversion module 106 includes a processor comprising an Internet Protocol re-formatter 134 and a modulator 136. The Internet Protocol conversion module 134 strips away the Internet Protocol formatting and converts the received RF signal to an MPEG transport stream. The modulator 136 modulates the MPEG transport stream onto a channel. As discussed below, the modulated MPEG transport stream is provided over this channel to an output 138 for supply to the RF connection 114 of the interface module 120 of the receiver 102. In the case where the receiver 102 is a digital television, the modulator 136 may be a VSB re-modulator.

The Internet Protocol conversion module 106 also includes switches 140 and 142. The switch 140 may be set to its upper contact (as viewed in FIG. 2) in order to directly pass the received RF signal through the Internet Protocol conversion module 106 to the output 138 of the Internet Protocol conversion module 106 for supply to the RF connection 114. Accordingly, when the switch 140 is set to its upper contact, the Internet Protocol re-formatter 134 and the modulator 136 are thereby bypassed. The switch 140 may instead be set to its lower contact in order to pass the received, re-formatted and modulated MPEG transport stream to the output of the Internet Protocol conversion module 106 for supply to the RF connection 114.

The switch 142 may be set to its upper contact (as viewed in FIG. 2) in order to couple control information derived by the Internet Protocol re-formatter 134 to an output side terminal 144 of the Internet Protocol conversion module 106 for supply to the control connection 118. The switch 142 may instead be set to its lower contact in order to pass control information received on the output side terminal 144 from the control connection 118 to an input side terminal 146 of the Internet Protocol conversion module 106 and to pass control information received on the input side terminal 146 from the Internet Protocol conversion module 106 to the output side terminal 144 and from there to the control connection 118.

Accordingly, when the switch 140 is set to its lower contact and the switch 142 is set to its upper contact as viewed in FIG. 2, the Internet Protocol re-formatter 134 strips away the Internet Protocol formatting of the Internet Protocol formatted signal received from the Internet Protocol distribution network 104, extracts any control information contained in this signal, and passes this extracted control information to the receiver 102. Also, the Internet Protocol re-formatter 134 extracts the MPEG files packets from the signal received from the Internet Protocol distribution network 104 and converts these extracted packets to an MPEG transport stream for supply to the modulator 136.

As should be recognized from the above description, the Internet Protocol conversion module 106 is backwards compatible, meaning that the Internet Protocol conversion module 106 can be used with legacy receivers, i.e., receivers existing prior to the present invention. In this case, the switch 140 is operated to its upper contact and the switch 142 is operated to its lower contact.

Certain modifications of the present invention have been discussed above. Other modifications of the present invention will occur to those practicing in the art of the present invention. For example, the Internet Protocol conversion module 106 includes the modulator 136 in order to modulate the re-formatted MPEG transport stream onto an RF channel for supply to the RF input of the receiver. Instead, the Internet Protocol conversion module 106 can be operated at baseband to supply the re-formatted MPEG transport stream as a baseband signal to a 1394 interface of the receiver 102. In this case, the modulator 136 need not be used.

Also, the Internet Protocol conversion module 106 can be external of the receiver 102 and/or the signal source 108.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. An interface module for use between a signal source and a receiver comprising:
   an input that receives a signal from the signal source, wherein the received signal contains MPEG files formatted according to an Internet Protocol;
   a processor that strips the Internet Protocol formatting from the received signal and that reformats the received signal as a receiver signal containing an MPEG transport stream without decompressing the received signal;
   an output that makes the reformatted signal available for supply to a port supported on a chassis of the receiver; and,
   a switch having two switch states permitting two way communication of control information through the interface module.

2. The interface module of claim 1 wherein a first switch state of the switch permits communication of control information from the processor to the receiver, and wherein a second switch state of the switch permits pass through communication of control information from the receiver.

3. The interface module of claim 1 wherein the switch comprises a first switch, wherein the interface module further comprises a second switch having first and second switch states, wherein the first switch state of the second switch passes the reformatted signal to the output, and wherein the second switch state of the second switch passes the received signal directly to the output thereby by-passing the processor.

4. The interface module of claim 3 wherein a first switch state of the first switch permits communication of control information from the processor to the receiver, and wherein a second switch state of the first switch permits pass through communication of control information from the receiver.

5. The interface module of claim 1 wherein the processor includes a modulator that modulates the MPEG transport stream onto an RF channel.

6. The interface module of claim 5 wherein the modulator comprises a VSB modulator.

7. An Internet Protocol interface module for use in providing an interface between a signal source and a digital television, wherein the signal source provides an Internet Protocol formatted signal, the Internet Protocol interface module comprising:
   a first input that receives an RF signal;
   a second input that receives the Internet Protocol formatted signal containing MPEG files;
   an output;
   an input side terminal;
   an output side terminal;
   a first connection that passes the received RF signal directly to the output;
   a second connection that passes control information directly from the output side terminal to the input side terminal;
   a re-formatter that strips the Internet Protocol formatting from the received signal, that reformats the received signal as an MPEG transport stream, and that passes control information to the output side terminal; and,
   a VSB modulator that modulates the MPEG transport stream onto an RF channel and that passes the modulated MPEG transport stream to the first connection for supply to the output.

8. The Internet Protocol interface module of claim 7 wherein the second connection includes a switch having first and second switch positions, wherein the first switch position permits the control information to be passed directly from the output side terminal to the input side terminal, and wherein the second position permits the control information to be passed from the re-formatter to the output side terminal.

9. The Internet Protocol interface module of claim 7 wherein the first connection includes a switch having first and second switch positions, wherein the first switch position couples the modulated MPEG transport stream from the VSB modulator to the output, and wherein the second switch position passes the received RF signal directly to the output.

10. The Internet Protocol interface module of claim 9 wherein the switch comprises a first switch, wherein the second connection includes a second switch having first and second switch positions, wherein the first switch position of the second switch permits the control information to be passed directly from the output side terminal to the input side terminal, and wherein the second position of the second switch permits the control information to be passed from the re-formatter to the output side terminal.

11. An interface module for use between a signal source and a receiver comprising:
    an input that receives a signal from the signal source, wherein the received signal contains MPEG files formatted according to an Internet Protocol;
    a processor that strips the Internet Protocol formatting from the received signal and that reformats the received signal as a receiver signal containing an MPEG transport stream without decompressing the received signal;
    an output that makes the reformatted signal available for supply to a port supported on a chassis of the receiver; and,
    a switch having first and second switch states, wherein the first switch state passes the reformatted signal to the output, and wherein the second switch state passes the received signal directly to the output thereby by-passing the processor.

12. The interface module of claim 11 further comprising connections permitting two way communication of control information through the interface module.

13. The interface module of claim 11 wherein the switch comprises a first switch, wherein the interface module comprises a second switch having two switch states permitting two way communication of control information through the interface module.

14. The interface module of claim 13 wherein a first state of the second switch permits communication of control information from the processor to the receiver, and wherein a second state of the second switch permits pass through communication of control information from the receiver.

15. The interface module of claim 11 wherein the processor includes a modulator that modulates the MPEG transport stream onto an RF channel.

16. The interface module of claim 15 wherein the modulator comprises a VSB modulator.

* * * * *